Patented Sept. 16, 1952

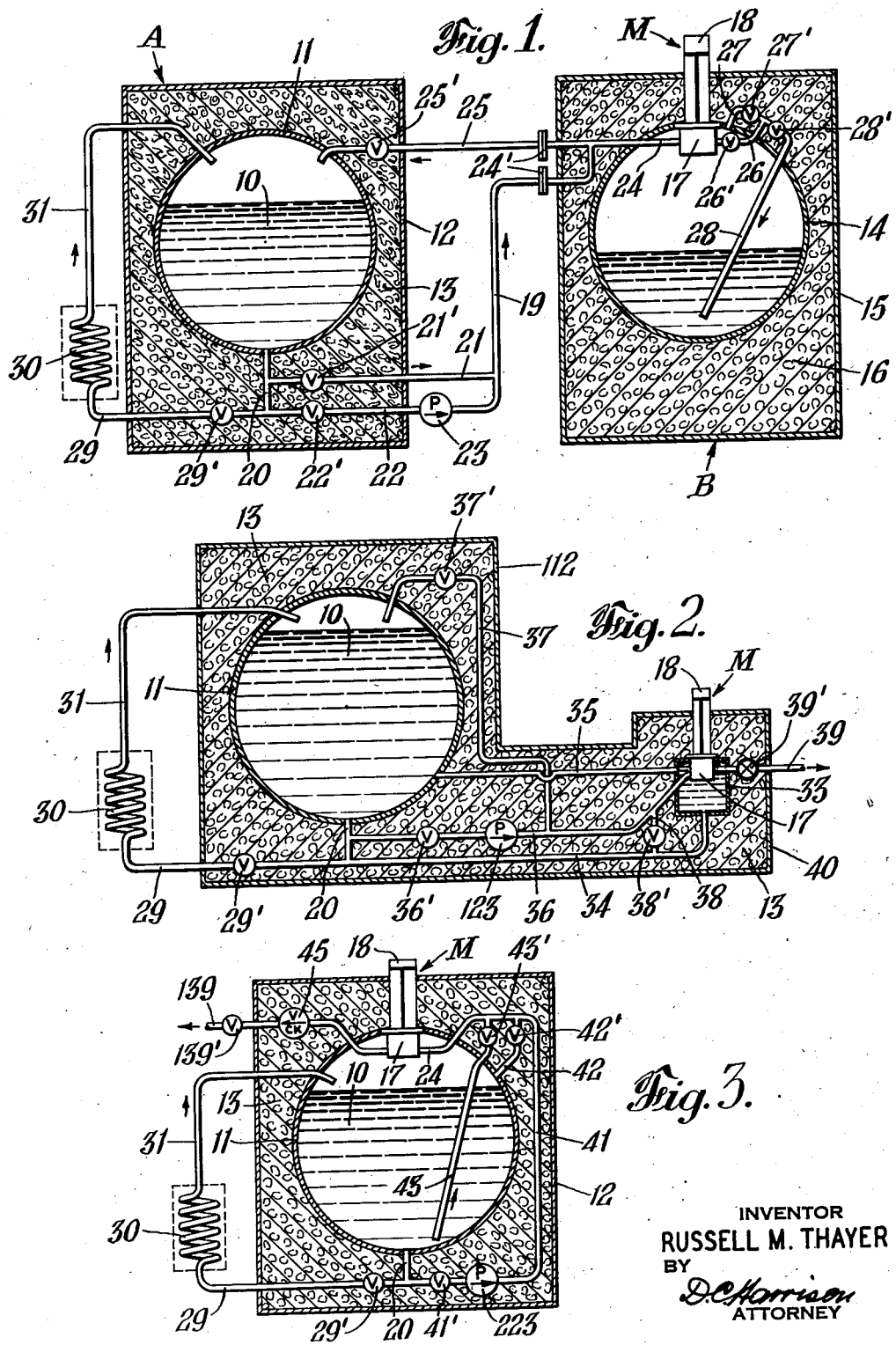

2,610,471

UNITED STATES PATENT OFFICE 2,610,471

PROCESS OF AND APPARATUS FOR METERING A LIQUEFIED GAS

Russell M. Thayer, Buffalo, N. Y., assignor, by mesne assignments, to Union Carbide and Carbon Corporation, a corporation of New York Application August 28, 1947, Serial No. 771,039

10 Claims. (Cl. 62—1)

This application relates to a process of and apparatus for accurately metering quantities of liquefied gas when transferred from a container to a receiver and particularly to the metering of a liquefied gas having a boiling point at atmospheric pressure below 233° K. such as liquid oxygen or liquid nitrogen.

The principal objects of the present invention are to provide an improved method and apparatus for metering exactly the amount of a portion of highly volatile liquefied gas when it is transferred from a container, in which a supply of the liquefied gas is held at a very low temperature, to a receiver such as a storage container or a gasifying chamber. More specifically it is an object of the invention to provide method of and apparatus for preventing false registration by a liquid meter when it is used to meter a portion of liquefied gas so transferred.

The invention is particularly advantageous for metering liquid oxygen and liquid nitrogen which have very low boiling points and are difficult to store in the liquid state. When such liquefied gases are transferred from one container to another it is often essential to determine the exact amount transferred, and various unsatisfactory expedients to determine the amount transferred have been resorted to, such as weighing either the supply vessel or the recipient before and after a quantity of liquefied gas is transferred or by measurements of the liquid levels before and after the transfer, but the former is extremely inconvenient if accuracy is required and the latter method is subject to considerable inherent inaccuracies.

According to the present invention the quantity of liquefied gas transferred is metered by passage through the metering elements of a positive displacement liquid meter of a type especially adapted to the handling of the particular low temperature liquefied gas to be metered. Such a meter has metering elements including a metering chamber with movable elements in the chamber such as pistons or a nutating plate, or rotary elements, the movement of which is in exact proportion to the volumetric amount of material passed through the chamber. The amount of the material passed through the meter is recorded by a register mechanism that is driven by the movable elements. A suitable construction of meter for liquid oxygen or liquid nitrogen is similar to that described in my copending application Serial No. 508,270 filed October 29, 1943, which issued November 16, 1948, as Patent No. 2,453,766.

In order that the amount of liquefied gas transfered may be accurately registered it is necessary that the movable elements shall be moved only by the liquid being transferred and not by any vapors. The liquefied gases are substantially at their boiling point temperatures and always tend to remain at the boiling point because heat constantly flows to the liquid even though the container holding the liquefied gas is provided with the best-known heat insulation. With such a liquefied gas any leakage of heat to the liquid causes vaporization, also any reduction of pressure on the liquid likewise causes boiling to occur.

Thus it is found that any heat leak to or reduction of pressure on such liquefied gas before it has passed through the metering elements of a meter will result in the passage through the meter of an indefinite amount of vapor with the liquid transferred and such vapor will move the metering elements and cause false registration. According to the present invention this difficulty is avoided by maintaining the metering elements of the meter constantly at the low temperature of the liquefied gas to be transferred. The liquid line to the inlet of the meter is likewise cooled to such low temperature before transfer of liquid is begun and the transfer of liquid from one container to the other is then carried out in such a manner that no appreciable or effective reduction of pressure on the liquefied gas occurs, at least until after passage through the meter.

The maintenance of the meter chamber and metering elements therein at the low temperature is preferably effected by mounting the metering chamber in heat conducting relation with or in contact with a body of the liquefied gas. This may be done in various ways, for example, by mounting the metering chamber in or on a receiving vessel which contains a portion of the liquefied gas remaining from a previous charge so that the metering chamber is in heat exchange relation with such portion of liquefied gas, or by mounting the metering chamber in or on the inner vessel of a supply container holding the supply of the liquefied gas. In either of these embodiments the metering chamber can be in thermal contact with the liquid itself or with the vapor which is immediately above the liquid and in heat exchange therewith. In a third embodiment the metering chamber is submerged in a portion of the liquefied gas held in a chamber that is in liquid communication with the main body of liquid in the supply container. Also the system for transferring liquefied gas through the cooled meter is carried out so that the pressure on the liquid is higher than the pressure at which the liquefied gas would boil at its existing temperature. In other words, the liquefied gas passed through the cooled meter is at least slightly subcooled. The desired amount of subcooling is preferably attained by obtaining a nonequilibrium pressure increase of the liquefied gas up to a point at the discharge side of the meter. Such pressure increase may be provided by pressurizing the supply of liquefied gas in the supply container or by the operation of a pump interposed in the transfer line between the supply container and the meter.

The above and other objects and novel features of this invention will become apparent from the following specification and the accompanying drawing, in which:

Fig. 1 is a diagrammatic view of one embodiment of the invention showing supply and receiving containers in section and a meter mounted on the receiving container;

Fig. 2 is a diagrammatic view of another embodiment showing the meter mounted on a chamber connected in liquid communication with the supply container; and Fig. 3 is a diagrammatic view of still another embodiment showing the meter mounted in the supply container.

Referring now to the drawing, and particularly to Fig. 1, a body of liquefied gas 10 is shown held within the inner vessel 11 of a supply container generally indicated at A, a receiving container being generally indicated at B. The supply container may be of customary construction, in which the inner vessel 11 is suspended or otherwise supported within an external casing 12 providing an insulating space completely surrounding the inner vessel, which space may be filled with insulating material 13 of a character that is very effective for reducing the flow of heat to the cold body of liquid 10. The inner vessel 11 may be provided with customary filling connections, liquid level test connections, and relief valves, all of which are not shown in the interest of clearness of the drawing.

The receiving container B may be of any customary construction, and in the embodiment of Fig. 1 is preferably of the insulated type comprising an inner vessel 14 which is supported within an outer casing 15 providing a space filled with insulation 16 around the inner vessel. The inner vessel 14 may be provided with liquid and vapor discharge conduits as required for utilization of the liquefied gas. Such withdrawal conduits are not illustrated in the interest of clearness of the drawing.

A meter for liquefied gas is diagrammatically indicated at M. As previously stated, such meter may be of the type described in my aforementioned patent application except that the cooling jacket surrounding the metering chamber is unnecessary. In the embodiment of Fig. 1 the metering chamber 17 of the meter M is mounted within the upper portion of the inner vessel 14 and the register portion 18 is arranged to extend through the top of the casing 15. Thus the register 18 is in a warm region and is accessible for observation, while the metering chamber 17 is kept cold directly by the vapors above the liquid in the inner vessel 14.

For transferring a portion of the liquefied gas 10 from container A to receiver B, there is provided a transfer conduit 19. The transfer conduit 19 is connected to an outlet 20 from the bottom of inner vessel 11 by alternative branches 21 and 22. Branch 21 has interposed therein a stop valve 21' and branch conduit 22 has interposed therein a stop valve 22' and also a pump for liquefied gas shown diagrammatically at 23. For liquid oxygen, a suitable pump may be similar to that described in U. S. Patent No. 2,340,747 issued February 1, 1944, to O. A. Hansen. Conduit 19 is coupled to an inlet connection 24 that passes through the inner vessel 14 to the inlet of the metering chamber 17. Also connected between the inlet connection 24 and the vapor space of the inner vessel 11 is a vapor return line 25 which is employed when priming the pump 23 and when cooling the transfer conduit 19. Conduit 25 is provided with a stop valve 25' and conduits 19 and 25 may have disconnectable couplings 24' interposed therein when the supply container A is portable. The discharge side of the meter chamber 17 is provided with a connection 26 having a control valve 26' therein and branches 27 and 28 connecting respectively to the vapor space and the liquid space of the inner vessel 14. These branches respectively are provided with stop valves 27' and 28'.

An alternative means for pressurizing the liquefied gas in the supply container is provided by a line 29 connecting the liquid outlet 20 with a vaporizing coil 30, the vapor discharge side of which is connected by a conduit 31 with the vapor space of the inner vessel 11. The connection 29 is provided with a stop valve 29'.

In operation, a small remainder of liquefied gas is usually in the inner vessel 14 so that the vapors thereof will keep the metering chamber 17 very cold. When it is desired to add a specific amount of liquefied gas to the receiver B, the supply container A is coupled to the receiver B by the conduits 19 and 25 at couplings 24'. The valves are adjusted so that valve 26' is closed, valve 25' is open, valves 21' and 29' are closed, and valve 22' is open so that a flow of liquid can occur through the connection 20, branch 22 and pump 23, the transfer conduit 19, and the return conduit 25. Portions of liquid entering the pump 23 will cool it down to operating temperature and when the pump is started liquefied gas will be circulated around and back to the inner vessel 10 so that the conduit 19 up to its connection with the conduit 24 will be cooled to the temperature of the liquefied gas. Valve 26' may then be opened and valve 25' closed. Valves 27' and 28' are adjusted as desired in order to proportion the discharge of liquid either or both into the gas space or the liquid space of the inner vessel 14 as may be desired according to whether the pressure in the inner vessel 14 is to be increased, kept constant, or decreased, the decrease in pressure being effected if desired by heat exchange between the inflowing liquid through branch 27 and the vapor in the inner vessel 14. The valve 26' is adjusted so that it is wide open if the pressure in the vessel 14 is higher than the original pressure in the inner vessel 11, or if the pressure in the inner vessel 14 should be lower, then the valve 26' is adjusted to throttle the liquid sufficiently to maintain a pressure on the liquid flowing through the meter 17 which is at least slightly higher than the pressure of the liquid body 10. When a desired amount of liquid has passed through the meter, the pump is shut down, the valves closed, and the supply container A may be disconnected.

An alternative mode of operation omits the use of the pump 23, the valve 22' then remaining closed. To build pressure on the liquid 10, the valve 29' is opened and liquid allowed to flow from the outlet 20 into the vaporizer coil 30. The liquid so vaporized passes into the vapor space above the liquid 10 and rapidly increases the pressure in a non-equilibrium manner. When sufficient pressure has been obtained, the valve 29' is closed and the valves 21' and 25' are opened so that some liquid will flow through branch 21 into the lower part of conduit 19. The vaporization of liquid in the lower part of conduit 19 will cool the conduit and the cold vapors thereof will pass up and through the conduit 25 so that the entire transfer conduit will be cooled. The valve 25' is then closed and the valve 26' opened, then by pressure difference, liquid will flow through the outlet 20, the branch 21, transfer conduit 19, and the inlet 24 to the meter chamber 17. The valves 26', 27', and 28' are adjusted as before so that there is no effective reduction of pressure on the liquid at least until after it has passed through the metering chamber 17. The small pressure reduction due to pipe line friction is less than the non-equilibrium pressure increase created in the container A and therefore such small pressure reduction is not effective to cause vaporization. If the pressure acting on the liquid body 10 should fall so that it is insufficient to drive liquid over to the container B, the valve 29' may be opened sufficiently to build the pressure to the desired value.

In the embodiment illustrated in Fig. 2 the liquefied gas receiving device is not illustrated as it may be of any kind customarily used such as a liquid gasifying chamber, a liquefied gas storing container, or a liquid vaporizing coil connected to a gas receiving means. In the figures, corresponding elements are designated by similar reference numerals. Thus the body of liquid 10 is held within an inner vessel 11 supported in and surrounded by insulation 13. The meter M is mounted so that its metering elements 17 are housed within an auxiliary liquid holding chamber 33 that holds a portion of the liquefied gas body 10, such portion being maintained in the chamber 33 by connections 34 and 35, connection 34 providing constant communication between the bottom of the chamber 33 and the outlet 20 of the inner vessel 11 and connection 35 providing constant communication between an upper portion of the chamber 33 and the inner vessel 11 at a point higher than the outlet 20. A liquid transfer conduit 36 is connected between the outlet 20 and the inlet of the meter 17. Conduit 36 has interposed therein a stop valve 36' and a liquid pump 123. A vapor return line 37 is connected to the conduit 36 on the discharge side of the pump 123 and to the vapor space of the inner vessel 11. This has a stop valve 37'. A by-pass connection 38 between conduits 34 and 36 and having a stop valve 38' is also provided. A discharge or delivery connection 39, provided with a control valve 39', conducts the liquefied gas from the liquefied gas meter 17 through the wall of the chamber 33 to the recipient for the liquid to be transferred. The valve 39' may be either a control valve or a check valve, the latter type being used only if the liquid receiving means has a pressure appreciably higher than the saturation pressure corresponding to the temperature of the liquid body 10. In most cases valve 39' is preferably a control valve adjustable to maintain a back pressure on the meter.

In this embodiment the chamber 33 is heavily insulated by a portion of the insulation 13 which is contained within an extension 40 of the outer casing 112. The chamber could be separately insulated provided that the connections 34 and 35 were also adequately insulated. Valves and the like which are within the insulation are provided with operating means extending to the outside of the insulating casing for convenience of operation.

Operation of this form of the invention is similar to that previously described in connection with Fig. 1, but the opportunity for more thorough insulation makes it easier to precool the transfer line. The meter is kept cold by the liquefied gas in the chamber 33. Any vapors produced in chamber 33 are discharged through the connection 35 to the inner vessel 11. Valves 36' and 37' are opened and the valve 39' is arranged or adjusted to maintain a back pressure on any liquid tending to pass through the discharge line 39. The pump 123 is started and liquid will flow from the outlet 20 through the conduits 36 and 37 until the pump is primed and the conduit 36 is cold. Valve 37' is then closed and the liquid will be discharged from the metering chamber 17 and passed through valve 39'. When a sufficient amount of liquid has passed, as indicated accurately by the register 18, the pump is shut down and the valves are closed.

If the pump is not to be used, the valve 36' will remain closed and the valve 38' is opened. Valve 37' may also be opened to insure that the line 38 is cold. Valve 29' is then opened for a sufficient time to build a pressure on the liquid body 10 sufficient to overcome any back pressure in the recipient connected with the delivery conduit 39. Valve 37' may then be closed and the liquid will flow, due to the difference of pressure, through conduit 34, by-pass 38, metering chamber 17, and the conduit 39, valve 39' being adjusted as previously described.

In the embodiment of Fig. 3, the metering chamber 17 of the meter M is mounted in the top of the inner vessel 11 of the supply container. The register 18 of the meter is disposed outside of the insulating casing 12, thus the metering chamber 17 is kept cold by the vapors above the body of liquid 10. Alternatively the metering chamber 17 could be so positioned that it is constantly immersed in the liquid of the body of liquefied gas 10. In this form of the invention a transfer conduit 41 is connected between the liquid outlet 20 and the inlet 24 of the metering chamber 17. The conduit 41 has interposed therein a stop valve 41' and a liquid pump 223. The discharge conduit 139 leads from the outlet of the metering chamber 17 through the container walls to a receiving means into which the liquefied gas is to be transferred, such receiving means being not shown in the interest of clearness. The conduit 139 preferably has interposed therein a check-valve 45 and a back pressure or control valve 139'. The upper part of the conduit 41 is connected to the vapor space above the liquid 10 by a connection 42 controlled by a stop valve 42'. A liquid eduction pipe 43 also is connected to the conduit 41 and has an opening in the lower part of the liquid space of the inner vessel 11. A valve 43' controls the pipe 43.

In the operation of the embodiment of Fig. 3, when using the liquid pump 223, valves 41' and 42' are opened and the pump started and run until it is primed and the conduit 41 is cooled by the flow of liquid from outlet 20 through conduit 41 and connection 42 back into the inner vessel 11. When the valve 42' is closed and valve 139' opened, liquid will flow through the metering chamber 17 and out through pipe 139. If the recipient pressure is high enough valve 139' may be opened wide and liquid will flow through the check valve 45 only when its pressure exceeds that in the recipient. If, however, the recipient pressure is lower than the original pressure of the supply vessel, the valve 139' is adjusted to maintain the desired back pressure on the meter. Thus, no vapors will form in the metering chamber 17 because it is initially sufficiently cool and because the back pressure valve 139' avoids any reduction of pressure until after the liquid has passed through the metering chamber 17.

If the pump 223 is not to be used, valves 41' and 42' remain closed and valve 29' is opened enough to evaporate some liquid in the coil 30 to momentarily raise the gas pressure in the inner vessel 11 to a value above the pressure in the receiving device. When valve 43' is then opened and valve 139' opened or adjusted, liquid will flow through the pipe 43 and through the precooled metering chamber 17 and out the discharge line 139, also without the occurrence of vapor in the portions of liquid flowing through the metering chamber 17.

It will be understood that the apparatus described herein may be modified, and that other changes may be made without departing from the spirit and scope of this invention, as defined in the appended claims.

What is claimed is:

1. A process of measuring accurately a quantity of liquefied gas of the type having a boiling point at atmospheric pressure below 233° K. when transferred from a supply source at low temperature to a receiver through the metering elements of a volumetric liquid meter adapted to register the amount of a liquefied gas passed therethrough, which process comprises providing continuous heat exchange between a body of said liquefied gas and the metering elements of said meter to maintain said metering elements substantially at the temperature of the liquefied gas to be transferred, such continuous heat exchange being established prior to the initiation of any flow through the metering elements; and passing said quantity of liquefied gas from said source through the cold metering elements to said receiver while maintaining the pressure on said quantity of liquefied gas during such passage at a value at least slightly higher than its vapor pressure at the temperature of the liquid at the source, whereby the actual quantity of said liquid transferred is measured as liquid.

2. A process of measuring accurately a quantity of liquefied gas of the type having a boiling point at atmospheric pressure below 233° K. according to claim 1 in which said continuous heat exchange is effected with vapor which is in equilibrium with the liquefied gas.

3. A process of measuring accurately a quantity of liquefied gas of the type having a boiling point at atmospheric pressure below 233° K. according to claim 1 in which said heat exchange is effected with a portion of said liquefied gas that is in constant communication with the liquefied gas in the supply container.

4. Apparatus for accurately measuring a quantity of liquefied gas of the type having a boiling point at atmospheric pressure below 233° K. in a system including a supply source of the liquefied gas at low temperature, a liquefied gas receiving means, a transfer conduit connected between said source and said receiving means, means for controllably effecting a flow of a desired portion of the liquefied gas through the transfer conduit from the source to the receiving means, said system including heat-insulated chamber holding a body of the liquefied gas at the low temperature independent of said transfer conduit, said apparatus comprising a volumetric liquid meter having a meter chamber and metering elements therein interposed directly in said transfer conduit, the metering elements being adapted to register the amount of liquefied gas passed through the meter chamber; and means for mounting said meter chamber in said insulated chamber holding the body of liquefied gas and in position to provide continuous heat exchange between said metering elements and said body of liquefied gas and maintain the metering elements substantially at the temperature of the liquefied gas prior to and during a transfer of liquid through said transfer conduit.

5. Apparatus for accurately measuring a quantity or liquefied gas of the type having a boiling point at atmospheric pressure below 233° K. according to claim 4 in which said body of liquid is at least a part of the liquefied gas of the supply source.

6. Apparatus for accurately measuring a quantity of liquefied gas of the type having a boiling point at atmospheric pressure below 233° K. when transferred from a supply container holding the liquefied gas at low temperature to a receiving means, which apparatus comprises a transfer conduit connected between the liquid space of said supply container and said receiving means; means for controllably effecting a flow of a desired portion of liquefied gas from the supply container to the receiving means; a volumetric liquid meter having a meter chamber and metering elements therein interposed in said transfer conduit, the metering elements being adapted to register the amount of liquefied gas passed through the meter chamber; and means for mounting said meter chamber in a portion of said supply container and in position to provide continuous heat exchange between said metering elements and gas material in said supply container, and maintain the meter elements substantially at the temperature of the liquefied gas prior to a transfer of liquid through them.

7. Apparatus for accurately measuring a quantity of liquefied gas of the type having a boiling point at atmospheric pressure below 233° K. when transferred from a supply container holding the liquefied gas at low temperature to a receiving means, which apparatus comprises a transfer conduit connected between the liquid space of said supply container and said receiving means; means for controllably effecting a flow of a desired portion of liquefied gas from the supply container to the receiving means; a volumetric liquid meter having a meter chamber and metering elements therein interposed in said transfer conduit, the metering elements being adapted to register the amount of liquefied gas passed through the meter chamber; a heat-insulated chamber holding a body of the liquefied gas and connected with the supply container to provide a free liquid communication between such body of liquid and the liquid in the supply container; and means for mounting said meter chamber in said heat insulated chamber in heat exchange relation to said body of liquid to maintain the meter elements substantially at the temperature of the liquefied gas prior to a transfer of liquid through them.

8. Apparatus for accurately measuring a quantity of liquefied gas of the type having a boiling point at atmospheric pressure below 233° K. when transferred from a supply source at low temperature to a heat insulated liquid-holding receiver chamber, which apparatus comprises a transfer conduit connected between said supply source and said receiver chamber; means for controllably effecting a flow of a desired portion of liquefied gas from the supply source to the receiver chamber; a volumetric liquid meter having a meter chamber and metering elements therein interposed in said transfer conduit, the metering elements being adapted to register the amount of liquefied gas passed through the meter chamber; and means for mounting said meter chamber in a portion of said receiver chamber and in position to provide continuous heat exchange between said metering elements and cold gas material in said receiver chamber previously charged thereinto, and maintain the meter elements substantially at the temperature of the liquefied gas prior to a transfer of liquid through them.

9. Apparatus for accurately measuring a quantity of liquefied gas of the type having a boiling point at atmospheric pressure below 233° K. according to claim 8 in which said transfer conduit on the discharge side of the meter is provided with branches, one of which communicates with the liquid space of said receiver chamber and the other of which communicates with the vapor space of said receiver chamber, and valve means for controlling flow through said branches.

10. Apparatus for accurately measuring a quantity of liquefied gas of the type having a boiling point at atmospheric pressure below 233° K. when transferred from a supply container holding the liquefied gas at low temperature to a receiver, which apparatus comprises a transfer conduit connected to the liquid space of said supply container and to a servicing connection connectable to said receiver; means for controllably effecting a flow of a desired portion of liquefied gas from the supply container through the transfer conduit to the servicing connection; a volumetric liquid meter having metering elements including a metering chamber interposed in said transfer conduit and adapted to register the amount of liquefied gas passing said metering elements; and an insulated chamber holding a portion of liquefied gas in heat exchanging relation to the metering chamber of said meter, said insulated chamber being connected in constant liquid communication with said supply container.

RUSSELL M. THAYER.

REFERENCES CITED

The following references are of record in the file of this patent:

UNITED STATES PATENTS

| Number | Name | Date |
|---|---|---|
| 2,007,251 | Kniskern | July 9, 1935 |
| 2,015,946 | Marden | Oct. 1, 1935 |
| 2,049,239 | Wilcox | July 28, 1936 |
| 2,291,678 | Benz et al. | Aug. 4, 1942 |
| 2,402,355 | Whaley, Jr. | June 18, 1946 |
| 2,453,766 | Thayer | Nov. 16, 1948 |